(12) United States Patent
Birnbaum et al.

(10) Patent No.: US 10,416,775 B2
(45) Date of Patent: Sep. 17, 2019

(54) SYSTEMS AND METHODS FOR SHIFTING HAPTIC FEEDBACK FUNCTION BETWEEN PASSIVE AND ACTIVE MODES

(71) Applicant: Immersion Corporation, San Jose, CA (US)

(72) Inventors: David M. Birnbaum, Van Nuys, CA (US); Christopher J. Ullrich, Ventura, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 16/223,989

(22) Filed: Dec. 18, 2018

(65) Prior Publication Data

US 2019/0121440 A1 Apr. 25, 2019

Related U.S. Application Data

(63) Continuation of application No. 15/443,482, filed on Feb. 27, 2017, now Pat. No. 10,203,756, which is a
(Continued)

(51) Int. Cl.
*G06F 3/041* (2006.01)
*G06F 3/01* (2006.01)
(Continued)

(52) U.S. Cl.
CPC ............ *G06F 3/016* (2013.01); *G06F 1/1613* (2013.01); *G06F 3/017* (2013.01); *G06F 3/0346* (2013.01);
(Continued)

(58) Field of Classification Search
CPC ...... G06F 3/1613; G06F 3/017; G06F 3/0346; G06F 3/04842; G06F 3/04845;
(Continued)

(56) References Cited

U.S. PATENT DOCUMENTS

| 4,873,623 A | 10/1989 | Lane et al. |
| 5,666,499 A | 9/1997 | Baudel et al. |

(Continued)

FOREIGN PATENT DOCUMENTS

| CN | 1599925 A | 3/2005 |
| CN | 1646833 B | 7/2005 |

(Continued)

OTHER PUBLICATIONS

U.S. Appl. No. 12/502,755, "Supplemental Notice of Allowance," dated Feb. 21, 2019, 2 pages.
(Continued)

*Primary Examiner* — Duc Q Dinh
(74) *Attorney, Agent, or Firm* — Kilpatrick Townsend & Stockton LLP

(57) ABSTRACT

Systems and methods for shifting haptic feedback function between passive and active modes are disclosed. For example, one disclosed method includes receiving a first signal from a sensor, the first signal associated with a mode of interaction with a graphical user interface; receiving a second signal associated with an interaction with the graphical user interface; determining a haptic feedback effect based at least in part on the mode of interaction with the graphical user interface and the interaction with the graphical user interface; and generating a haptic signal configured to output the haptic feedback effect.

19 Claims, 5 Drawing Sheets

Related U.S. Application Data continuation of application No. 14/712,358, filed on May 14, 2015, now Pat. No. 9,612,662, which is a continuation of application No. 13/832,420, filed on Mar. 15, 2013, now Pat. No. 9,063,571, which is a continuation of application No. 12/502,758, filed on Jul. 14, 2009, now Pat. No. 8,462,125.

(60) Provisional application No. 61/181,280, filed on May 26, 2009, provisional application No. 61/148,312, filed on Jan. 29, 2009, provisional application No. 61/080,985, filed on Jul. 15, 2008, provisional application No. 61/080,981, filed on Jul. 15, 2008, provisional application No. 61/080,978, filed on Jul. 15, 2008, provisional application No. 61/080,987, filed on Jul. 15, 2008.

(51) Int. Cl.
| | | |
|---|---|---|
| *H04M 1/725* | (2006.01) | |
| *H04W 4/21* | (2018.01) | |
| *G06F 1/16* | (2006.01) | |
| *G06F 3/0346* | (2013.01) | |
| *H04M 19/04* | (2006.01) | |
| *G08B 6/00* | (2006.01) | |
| *G06F 3/0484* | (2013.01) | |
| *G06F 3/0488* | (2013.01) | |
| *G06F 3/16* | (2006.01) | |

(52) U.S. Cl.
CPC ........... *G06F 3/041* (2013.01); *G06F 3/0488* (2013.01); *G06F 3/04842* (2013.01); *G06F 3/04845* (2013.01); *G06F 3/04883* (2013.01); *G06F 3/04886* (2013.01); *G06F 3/167* (2013.01); *G08B 6/00* (2013.01); *H04M 1/72544* (2013.01); *H04M 1/72547* (2013.01); *H04M 1/72572* (2013.01); *H04M 19/047* (2013.01); *H04W 4/21* (2018.02); *G06F 2200/1637* (2013.01); *G06F 2203/014* (2013.01); *G06F 2203/04101* (2013.01); *G06F 2203/04104* (2013.01); *G06F 2203/04106* (2013.01); *G06F 2203/04808* (2013.01); *H04M 2250/12* (2013.01)

(58) Field of Classification Search
CPC ............... G06F 3/0488; G06F 3/30483; G06F 3/30486; G06F 3/167; G06F 2203/014; G06F 2203/015; G06F 3/04812; G06F 3/0483; G06F 2203/04809; G06F 3/048; G06F 17/5009; H04M 19/047; H04M 1/72544; H04M 1/72547; H04M 1/72572; H04M 2250/12
USPC .................................................. 715/700–702
See application file for complete search history.

(56) References Cited

U.S. PATENT DOCUMENTS

| | | | |
|---|---|---|---|
| 5,844,547 | A | 12/1998 | Minakuchi et al. |
| 6,434,604 | B1 | 8/2002 | Harada et al. |
| 6,545,669 | B1 | 4/2003 | Kinawi et al. |
| 6,573,883 | B1 | 6/2003 | Bartlett |
| 6,639,582 | B1 | 10/2003 | Shrader |
| 6,803,924 | B1 | 10/2004 | Snibbe et al. |
| 6,903,723 | B1 | 6/2005 | Forest |
| 6,963,762 | B2 | 11/2005 | Kaaresoja et al. |
| 7,081,882 | B2 | 7/2006 | Sowden et al. |
| 7,176,866 | B2 | 2/2007 | Teraishi et al. |
| 7,176,886 | B2 | 2/2007 | Marvit et al. |
| 7,191,191 | B2 | 3/2007 | Peurach et al. |
| 7,450,110 | B2 | 11/2008 | Shahoian et al. |
| 7,468,573 | B2 | 12/2008 | Dai et al. |
| 7,548,232 | B2 | 6/2009 | Shahoian et al. |
| 7,721,968 | B2 | 5/2010 | Wigdor |
| 7,788,032 | B2 | 8/2010 | Moloney |
| 7,810,247 | B2 | 10/2010 | Fourquin et al. |
| 8,123,614 | B2 | 2/2012 | Kulas |
| 8,201,108 | B2 | 6/2012 | Chen et al. |
| 8,239,769 | B2 | 8/2012 | Ruiz-Velasco et al. |
| 8,266,551 | B2 | 9/2012 | Boldyrev et al. |
| 8,271,902 | B1 | 9/2012 | Mangini et al. |
| 8,306,576 | B2 | 11/2012 | Cho et al. |
| 8,316,166 | B2 | 11/2012 | Grant et al. |
| 8,462,125 | B2 | 6/2013 | Birnbaum et al. |
| 8,516,396 | B2 | 8/2013 | Bromenshenkel et al. |
| 8,587,601 | B1 | 11/2013 | Wallacker et al. |
| 8,595,649 | B2 | 11/2013 | Warfel et al. |
| 8,638,301 | B2 | 1/2014 | Birnbaum et al. |
| 8,866,602 | B2 | 10/2014 | Birnbaum et al. |
| 8,933,891 | B2 | 1/2015 | Eom et al. |
| 8,984,444 | B2 | 3/2015 | O |
| 9,063,571 | B2 | 6/2015 | Birnbaum et al. |
| 2001/0010513 | A1 | 8/2001 | Rosenberg et al. |
| 2001/0035854 | A1 | 11/2001 | Rosenberg et al. |
| 2001/0045941 | A1 | 11/2001 | Rosenberg et al. |
| 2001/0050693 | A1 | 12/2001 | Nishiyama et al. |
| 2002/0140625 | A1 | 10/2002 | Kidney et al. |
| 2002/0154168 | A1 | 10/2002 | Ijas et al. |
| 2002/0177471 | A1 | 11/2002 | Kaaresoja et al. |
| 2003/0063067 | A1 | 4/2003 | Chuang |
| 2003/0063128 | A1 | 4/2003 | Salmimaa et al. |
| 2003/0100969 | A1 | 5/2003 | Jones |
| 2003/0128237 | A1 | 7/2003 | Sakai et al. |
| 2003/0162595 | A1 | 8/2003 | Serbanescu |
| 2003/0188594 | A1 | 10/2003 | Levin et al. |
| 2004/0008191 | A1 | 1/2004 | Poupyrev et al. |
| 2004/0058718 | A1 | 3/2004 | Yu et al. |
| 2004/0067780 | A1 | 4/2004 | Eiden et al. |
| 2004/0075691 | A1 | 4/2004 | Moon et al. |
| 2004/0263479 | A1 | 12/2004 | Shkolnikov |
| 2005/0052430 | A1 | 3/2005 | Shahoian et al. |
| 2005/0058268 | A1 | 3/2005 | Koch et al. |
| 2005/0093868 | A1 | 5/2005 | Hinckley |
| 2005/0108660 | A1 | 5/2005 | Cheng et al. |
| 2005/0114142 | A1 | 5/2005 | Asukai et al. |
| 2005/0124412 | A1 | 6/2005 | Son et al. |
| 2005/0134561 | A1 | 6/2005 | Tierling et al. |
| 2005/0179617 | A1 | 8/2005 | Matsui et al. |
| 2005/0184696 | A1 | 8/2005 | Anastas et al. |
| 2005/0210410 | A1 | 9/2005 | Ohwa et al. |
| 2005/0216568 | A1 | 9/2005 | Walkush et al. |
| 2005/0216867 | A1 | 9/2005 | Marvit et al. |
| 2005/0219211 | A1 | 10/2005 | Kotzin et al. |
| 2005/0219223 | A1 | 10/2005 | Kotzin et al. |
| 2006/0028453 | A1 | 2/2006 | Kawabe |
| 2006/0061545 | A1 | 3/2006 | Hughes et al. |
| 2006/0109102 | A1 | 5/2006 | Gortz et al. |
| 2006/0181510 | A1 | 8/2006 | Faith |
| 2006/0197753 | A1 | 9/2006 | Hotelling |
| 2006/0241864 | A1 | 10/2006 | Rosenberg et al. |
| 2006/0255683 | A1 | 11/2006 | Suzuki et al. |
| 2006/0256074 | A1 | 11/2006 | Krum et al. |
| 2006/0258378 | A1 | 11/2006 | Kaikuranata |
| 2006/0279476 | A1 | 12/2006 | Obata |
| 2006/0279542 | A1 | 12/2006 | Flack et al. |
| 2006/0284849 | A1 | 12/2006 | Grant et al. |
| 2006/0288137 | A1 | 12/2006 | Grant et al. |
| 2007/0040810 | A1 | 2/2007 | Dowe et al. |
| 2007/0049301 | A1 | 3/2007 | Mock et al. |
| 2007/0057913 | A1 | 3/2007 | Eid et al. |
| 2007/0066283 | A1 | 3/2007 | Haar et al. |
| 2007/0082707 | A1 | 4/2007 | Flynt et al. |
| 2007/0124503 | A1 | 5/2007 | Ramos et al. |
| 2007/0139366 | A1 | 6/2007 | Dunko et al. |
| 2007/0146347 | A1 | 6/2007 | Rosenberg et al. |
| 2007/0152984 | A1 | 7/2007 | Ording et al. |
| 2007/0157089 | A1 | 7/2007 | Van et al. |
| 2007/0168118 | A1 | 7/2007 | Lappe et al. |
| 2007/0171046 | A1 | 7/2007 | Diem et al. |

(56) References Cited

U.S. PATENT DOCUMENTS

| | | | |
|---|---|---|---|
| 2007/0242056 A1 | 10/2007 | Engelhardt et al. | |
| 2007/0247442 A1 | 10/2007 | Andre et al. | |
| 2008/0020843 A1 | 1/2008 | Wolinsky | |
| 2008/0055269 A1 | 3/2008 | Lemay et al. | |
| 2008/0100572 A1 | 5/2008 | Boillot et al. | |
| 2008/0133336 A1 | 6/2008 | Altman et al. | |
| 2008/0143685 A1 | 6/2008 | Lee et al. | |
| 2008/0153520 A1 | 6/2008 | Kirtane | |
| 2008/0153554 A1 | 6/2008 | Yoon et al. | |
| 2008/0168403 A1 | 7/2008 | Westerman et al. | |
| 2008/0231594 A1 | 9/2008 | Hardwick et al. | |
| 2008/0244681 A1 | 10/2008 | Gossweiler et al. | |
| 2008/0287147 A1 | 11/2008 | Grant et al. | |
| 2008/0300055 A1 | 12/2008 | Lutnick et al. | |
| 2008/0307322 A1 | 12/2008 | Stochosky et al. | |
| 2009/0073118 A1 | 3/2009 | Yamaji et al. | |
| 2009/0098888 A1 | 4/2009 | Yoon | |
| 2009/0100384 A1 | 4/2009 | Louch | |
| 2009/0140986 A1 | 6/2009 | Karkkainen et al. | |
| 2009/0167509 A1* | 7/2009 | Fadell | G06F 3/016 340/407.2 |
| 2009/0167701 A1* | 7/2009 | Ronkainen | G06F 3/016 345/173 |
| 2009/0295743 A1 | 12/2009 | Nakajoh | |
| 2009/0309825 A1 | 12/2009 | Sodergren et al. | |
| 2010/0004008 A1 | 1/2010 | Abolrous et al. | |
| 2010/0013777 A1 | 1/2010 | Baudisch et al. | |
| 2013/0201141 A1 | 8/2013 | Birnbaum et al. | |
| 2014/0091914 A1 | 4/2014 | Birnbaum et al. | |
| 2014/0104162 A1 | 4/2014 | Birnbaum et al. | |
| 2014/0189506 A1 | 7/2014 | Birnbaum et al. | |
| 2015/0002280 A1 | 1/2015 | Birnbaum et al. | |
| 2015/0199013 A1 | 7/2015 | Birnbaum et al. | |
| 2015/0268727 A1 | 9/2015 | Birnbaum et al. | |

FOREIGN PATENT DOCUMENTS

| | | |
|---|---|---|
| CN | 1856763 A | 11/2006 |
| CN | 101178615 | 5/2008 |
| CN | 102301319 | 12/2011 |
| CN | 103970209 | 8/2014 |
| CN | 104111726 | 10/2014 |
| CN | 102301319 | 11/2014 |
| CN | ZL200980127923.0 | 1/2015 |
| CN | 104407667 | 3/2015 |
| CN | 104571336 | 4/2015 |
| EP | 581591 | 2/1994 |
| EP | 0 899 650 | 3/1999 |
| EP | 1 401 185 | 3/2004 |
| EP | 1 728 142 | 12/2006 |
| EP | 1 731 993 | 12/2006 |
| EP | 2391934 | 9/2011 |
| EP | 1731993 | 2/2013 |
| EP | 3130983 | 2/2017 |
| FR | 2910160 | 6/2008 |
| GB | 2 416 962 | 2/2006 |
| JP | 04249835 | 9/1992 |
| JP | 05-100809 | 4/1993 |
| JP | 05152054 | 6/1993 |
| JP | 06-242886 A | 9/1994 |
| JP | 10240434 | 9/1998 |
| JP | 10341253 | 12/1998 |
| JP | 11015600 | 1/1999 |
| JP | 11033705 | 2/1999 |
| JP | 2000325653 | 11/2000 |
| JP | 3085481 | 5/2002 |
| JP | 2003177864 | 6/2003 |
| JP | 2003-188945 | 7/2003 |
| JP | 2003-188946 | 7/2003 |
| JP | 2004-177992 | 6/2004 |
| JP | 2004164242 | 6/2004 |
| JP | 2004521424 | 7/2004 |
| JP | 2004-242728 A | 9/2004 |
| JP | 2005505847 | 2/2005 |
| JP | 2005-152054 | 6/2005 |
| JP | 2006-040005 | 2/2006 |
| JP | 2006-511134 A | 3/2006 |
| JP | 2006/163579 A | 6/2006 |
| JP | 2006-201912 | 8/2006 |
| JP | 2006518507 | 8/2006 |
| JP | 2006333355 | 12/2006 |
| JP | 2006345269 | 12/2006 |
| JP | 2007/188126 A | 7/2007 |
| JP | 2007-531113 | 11/2007 |
| JP | 2007-531158 | 11/2007 |
| JP | 2007-535273 | 11/2007 |
| JP | 2007301270 | 11/2007 |
| JP | 2008546360 | 12/2008 |
| JP | 2009217805 | 9/2009 |
| JP | 5410520 | 11/2013 |
| JP | 20142770 | 1/2014 |
| JP | 2014067430 | 4/2014 |
| JP | 2014139797 | 7/2014 |
| JP | 2014170560 | 9/2014 |
| JP | 2014170568 | 9/2014 |
| JP | 2014194785 | 10/2014 |
| JP | 2015007998 | 1/2015 |
| JP | 5690726 | 2/2015 |
| JP | 5690726 | 3/2015 |
| JP | 2015057719 | 3/2015 |
| JP | 5762285 | 6/2015 |
| JP | 5793426 | 8/2015 |
| KR | 10-2001-0108361 | 12/2001 |
| KR | 10-2005-0037484 A | 4/2005 |
| KR | 10-2005-004382 | 11/2005 |
| KR | 10-2006-0106010 | 10/2006 |
| KR | 1020060134119 | 12/2006 |
| KR | 10-2007-0007808 | 1/2007 |
| KR | 1020070028308 | 3/2007 |
| KR | 10-0775190 | 11/2007 |
| KR | 10-2008-0058124 | 6/2008 |
| KR | 10-0671144 A1 | 9/2008 |
| KR | 101300429 | 8/2013 |
| KR | 101522145 | 5/2015 |
| WO | 2002/03172 | 1/2002 |
| WO | 2002/057885 | 7/2002 |
| WO | 2003/034196 | 4/2003 |
| WO | 2003/042805 | 5/2003 |
| WO | 2004/044728 A2 | 5/2004 |
| WO | 2004/075169 A2 | 9/2004 |
| WO | 2005/103860 | 11/2005 |
| WO | 2005/103862 | 11/2005 |
| WO | 2005/103863 | 11/2005 |
| WO | 2005/112287 A1 | 11/2005 |
| WO | 2006/013363 A1 | 2/2006 |
| WO | 2006/094308 | 9/2006 |
| WO | 2008/132540 A1 | 11/2008 |
| WO | 2008150809 | 12/2008 |
| WO | 2009/074185 A1 | 6/2009 |

OTHER PUBLICATIONS

CN 201510019130.4, "Office Action," dated Dec. 5, 2018, 15 pages.
KR 10-2016-7002561, "Notice of Decision to Grant," dated Dec. 18, 2018, 4 pages.
KR 10-2018-7006662, "Office Action," dated Dec. 6, 2018, 6 pages.
KR 10-2018-7033607, "Office Action," dated Feb. 18, 2019, 8 pages.
Anonymous: "CSCW 2002—Interactive Posters," Jun. 26, 2002, pp. 1-1, XP55082201, Retrieved from the Internet: URL:http://www.acm.org/conferences/cscw2002/cfp-posters.html (retrieved on Oct. 12, 2013).
Biet, M. et al., "Discrimination of Virtual Square Gratings by Dynamic Touch on Friction Based Tactile Displays," Haptic Interfaces for Virtual Environment and Teleoperator Systems, 2008, Symposium, IEEE, Piscataway, NJ, XP031339918, pp. 41-48, Mar. 2008.
Brown, L.M. and Williamson, J., "Shake2Talk: Multimodal Messaging for Interpersonal Communication," Oakley I. and Brewster, S. (eds.), HAID 2007, LNCS 4813, pp. 44-55.
U.S. Appl. No. 12/502,755, Examiner's Answer dated Sep. 27, 2016.

(56) References Cited

OTHER PUBLICATIONS

U.S. Appl. No. 12/502,755, Final Office Action dated Feb. 11, 2016.
U.S. Appl. No. 12/502,755, Examiner's Answer dated Jul. 30, 2015.
U.S. Appl. No. 12/502,755, Non-Final Office Action dated Jul. 30, 2015.
U.S. Appl. No. 12/502,755, Final Office Action dated May 21, 2014.
U.S. Appl. No. 12/502,755, Non-Final Office Action Oct. 23, 2013.
U.S. Appl. No. 12/502,755, Final Office Action dated Apr. 25, 2012.
U.S. Appl. No. 12/502,755, Non-Final Office Action dated Nov. 16, 2011.
U.S. Appl. No. 12/502,758, Notice of Allowance dated Jan. 31, 2013, pp. 4.
U.S. Appl. No. 12/502,758, Office Action dated Sep. 11, 2012, 19 pages.
U.S. Appl. No. 12/502,795, Examiner's Answer dated Apr. 24, 3017.
U.S. Appl. No. 12/502,795, Final Office Action dated Jun. 7, 2016.
U.S. Appl. No. 12/502,795, Non-Final Office Action dated Jan. 27, 2016.
U.S. Appl. No. 12/502,795, Final Office Action dated Jan. 5, 2015.
U.S. Appl. No. 12/502,795, Non-Final Office Action dated Jul. 30, 2014.
U.S. Appl. No. 12/502,795, Final Office Action dated Sep. 30, 2013.
U.S. Appl. No. 12/502,795, Office Action dated Feb. 28, 2013.
U.S. Appl. No. 12/502,795, Non-Final Office Action dated Aug. 17, 2012.
U.S. Appl. No. 12/502,795, Final Office Action dated Mar. 6, 2012.
U.S. Appl. No. 12/502,795, Non-Final Office Action dated Oct. 5, 2011.
U.S. Appl. No. 12/697,030, Final Office Action dated Apr. 21, 2017.
U.S. Appl. No. 12/697,030, Non-Final Office Action dated Oct. 31, 2016.
U.S. Appl. No. 12/697,030, Final Office Action dated Jun. 3, 2013.
U.S. Appl. No. 12/697,030, Office Action dated Feb. 27, 2013.
U.S. Appl. No. 12/697,030, Office Action dated Sep. 26, 2012.
U.S. Appl. No. 13/832,420, Non Final Office Action dated Jul. 3, 2013, 8 pages.
U.S. Appl. No. 13/832,420, Final Office Action dated Dec. 31, 2013.
U.S. Appl. No. 13/832,420, Non Final Office Action dated Aug. 22, 2014, 19 pages.
U.S. Appl. No. 13/832,420, Notice of Allowance dated Feb. 17, 2015, 12 pages.
U.S. Appl. No. 14/198,884, Non-Final Office Action dated Dec. 19, 2016.
U.S. Appl. No. 14/612,392, Final Office Action dated Mar. 8, 2017.
U.S. Appl. No. 14/612,392, Non-Final Office Action dated Aug. 24, 2016.
U.S. Appl. No. 14/612,392, Final Office Action dated Mar. 30, 2016.
U.S. Appl. No. 14/612,392, Non-Final Office Action dated Oct. 5, 2015.
U.S. Appl. No. 14/712,358, Notice of Allowance dated Nov. 18, 2016, 8 pages.
U.S. Appl. No. 14/712,358, Final Office Action dated Aug. 9, 2016, 11 pages.
U.S. Appl. No. 14/712,358, Non-Final Office Action dated Dec. 30, 2015, 23 pages.
Chinese Patent Office Application No. 200980127938.7, Office Action dated Jul. 20, 2016.
Chinese Patent Office Application No. 200980127938.7, Office Action dated Jan. 25, 2016.
Chinese Patent Office Application No. 200980127938.7, Office Action dated Aug. 10, 2015.
Chinese Patent Office Application No. 200980127938.7, Office Action dated Nov. 4, 2014.
Chinese Patent Office Application No. 200980127938.7, Office Action dated May 16, 2014.
Chinese Patent Office Application No. 200980127938.7, Office Action dated Sep. 17, 2013.
Chinese Patent Office Application No. 200980127938.7, Office Action dated Nov. 29, 2012.
Chinese Patent Office Application No. 200980127939.1, Notification of Reexamination dated Feb. 15, 2016.
Chinese Patent Office Application No. 200980127939.1, Notification of Reexamination dated Aug. 12, 2015.
Chinese Patent Office Application No. 200980127939.1, Decision of Rejection dated May 6, 2014.
Chinese Patent Office Application No. 200980127939.1, Office Action dated Dec. 6, 2012, 12 pages.
Chinese Patent Office Application No. 200980127939.1, Office Action dated Nov. 12, 2013.
Chinese Patent Office Application No. 200980127939.1, Office Action dated Jul. 18, 2013.
Chinese Patent Office Application No. 200980127939.1, Office Action dated Dec. 6, 2012.
Chinese Patent Office Application No. 201410153123.9, Notification of First Office Action dated Oct. 31, 2016.
Dewitt, A., "Designing Sonification of User Data in Affective Interaction," Master of Science Thesis Stockholm, Sweden, XP 002551466, at hppt://w3.nada.kth.se/utbildning/grukth/exjobb/rapportlistor/2007/rapporter07/de_witt_anna-07142, as available via the internet and printed Oct. 20, 2009.
European Patent Office Application No. 09790404.9, Office Action dated Feb. 7, 2017.
European Patent Office Application No. 09790404.9, Office Action dated May 31, 2016.
European Patent Office Application No. 09790404.9, Office Action dated Aug. 4, 2014.
European Patent Office Application No. 09790404.9, Office Action dated Oct. 14, 2013.
European Patent Office Application No. 09790406.4, Summons to Oral Proceedings dated Dec. 3, 2015.
European Patent Office Application No. 09790406.4, Office Action dated May 4, 2015.
European Patent Office Application No. 09790406.4, Office Action dated Jul. 30, 2014.
European Patent Office Application No. 09790406.4, Office Action dated Oct. 14, 2013.
European Patent Office Application No. 09790414.8, Decision to Refuse a European Patent dated Dec. 13, 2016.
European Patent Office Application No. 09790414.8, Summons to attend Oral Proceedings dated Jun. 9, 2016.
European Patent Office Application No. 09790414.8, Office Action dated Aug. 4, 2014.
European Patent Office Application No. 09790414.8, Office Action dated Oct. 14, 2013.
European Patent Office Application No. 10736451.5, Extended European Search Report dated Sep. 26, 2013.
European Patent Office Application No. 14151328.3, Extended European Search Report dated Mar. 18, 2014.
Holmquist, L. et al., Smart-Its Friends: A Technique for Users to Easily Establish Connections between Smart Artefacts, Technical Note to UbiComp, 2001, pp. 1-6, XP008050420.
Japanese Patent Office Application No. 2014-087038, Decision of Rejection dated Jan. 17, 2017.
Japanese Patent Office Application No. 2014-087038, Final Notice of Reasons for Rejection dated Jul. 5, 2016.
Japanese Patent Office Application No. 2014-087038, Office Action dated Jul. 7, 2015.
Japanese Patent Office Application No. 2016-039643, Office Action dated Nov. 29, 2016.
Kaaresoja, T. et al., "Snap-Crackle-Pop: Tactile Feedback for Mobile Touch Screens," proceedings of the Eurohaptics 2006, XP002551465, at http://lsc.unv-evry.fr/eurohaptics/upload/cd/papers/f80 as available via the intent and printed Oct. 20, 2009. 2 pages.
Korean Patent Office Application No. 10-2011-7003437, Notice of Final Rejection dated Sep. 5, 2016.
Korean Patent Office Application No. 10-2011-7003437, Notice of Final Rejection dated May 1, 2016.
Korean Patent Office Application No. 10-2011-7003437, Office Action dated Jul. 28, 2015.

(56) References Cited

OTHER PUBLICATIONS

Korean Patent Office Application No. 10-2011-7003491, Notice of Final Rejection dated Oct. 13, 2016.
Korean Patent Office Application No. 10-2011-7003491, Notice of Final Rejection dated Jun. 28, 2016.
Korean Patent Office Application No. 10-2011-7003491, Notice of Preliminary Rejection dated Jul. 28, 2015.
Korean Patent Office Application No. 10-2016-7002451, Notice of Preliminary Rejection dated Jan. 6, 2017.
Korean Patent Office Application No. 10-2016-7002451, Notice of Preliminary Rejection dated May 19, 2016.
Korean Patent Office Application No. 10-2016-7002561, Office Action dated Feb. 9, 2017.
Korean Patent Office Application No. 10-2016-7002561, Notice of Final Rejection dated Dec. 12, 2016.
Korean Patent Office Application No. 10-2016-7002561, Notice of Preliminary Rejection dated Apr. 29, 2016.
Korean Patent Office Application No. 10-2016-7026279, Notice of Final Rejection dated Oct. 27, 2016.
Korean Patent Office Application No. 10-2016-7027748, Notice of Preliminary Rejection dated Nov. 21, 2016.
Oakley et al., "Contact IM: Exploring Asynchronous Touch Over Distance," Palpable Machines Research Group, Medical Lab Europe, XP 007910188, at http://www.whereveriam.org/work/palpable/Contact!M.pdf, Jan. 1, 2002, as available via the internet and printed Oct. 20, 2009.
Poupyrev, I. et al., "Ambient Touch: Designing Tactile Interfaces for Handheld Devices," {poup, rekimoto}@csl.sony.co.jp, shigeaki.maruyama@jp.sony.com http://www.csl.sony.co.jp/IL.
Rovers, A. et al., "HIM: A Framework for Haptic Instant Messaging," CHI 2004 (CHI Conference Proceedings, Human Factors in Computing Systems), XP 002464573, Vienna, Austria, Apr. 2004, pp. 1313-1316.
Sekiguchi, Y. et al., "Haptic Interface Using "Estimation of Box Contents" Metaphor", Proceedings of ICAT 2003, 13th International Conference on Artificial Reality and Telexistence, Japan, The Virtual Reality Society of Japan, Dec. 3, 2003, 13:197-2002, URL, http://www.vrsj.org/ic-at.org/papers/2003/00947_00000.
Smith, J. et al., "Communicating emotion through a haptic link: Design space and methodology," Int. J. Human-Computer Studies, 2007, 65:376-387.
Snibbe, S.S. et al., "Haptic Techniques for Media Control," Proceedings of 14th Annual ACM Symposium on User Interface Software and Technology, Orlando, Florida, Nov. 2001.
Sommerer, C. et al., Mobile Feelings—Wireless Communication of Heartbeat and Breath for Mobile Art, The 14th International Conference on Artificial Reality and Telexistence (ICAT 2004), 2004, web page at http://www.interface.ufg.ac.at/christa-laurent/WORKS/PDF/ICAT04SommererReference.pdf.
Verplank, B. et al., "THE PLANK: Designing a simple haptic controller," Proceedings of the Conference on New Instruments for Musical Expression, Dublin, Ireland, May 24-26, 2012.
Williamson, J., et al., "Excitatory Multimodal Interaction on Mobile Devices," CHI 2007, Proceedings of the SGCHI Conference on Human Factors in Computing Systems, US, ACM Association for Computing Machinery, NY, USA, Apr. 28, 2007, pp. 121-124.
U.S. Appl. No. 14/198,884, Final Office Action dated Jun. 15, 2017.
Japanese Patent Office Application No. 2016-154485, Office Action dated Jun. 6, 2017.
Korean Patent Office Application No. 10-2016-7027748, Office Action dated Jun. 30, 2017.
Korean Patent Office Application No. 10-2016-7026279, Office Action dated May 26, 2017.
Korean Patent Office Application No. 10-2017-7006891, Office Action dated May 22, 2017.
European Patent Office Application No. 14151328.3, Office Action dated Jul. 19, 2017, 8 pages.
"CSCW 2002 Program: Interactive Posters", Available Online at:- http://oldwww.acm.org/conferences/cscw2002/prog-posters.html, Oct. 18, 2002, 5 pages.
Oakley et al.; "Contact IM: Exploring Asynchronous Touch Over Distance"; Available Online at:- https://pdfs.semanticscholar.org/ce16/a1c4663db206a72bb087ad0489421fb68a27.pdf, Nov. 16, 2002, 2 pages.
State Intellectual Property Office of the Peoples Republic of China Application 201510019130.4, Office Action dated Jul. 24, 2017, 7 pages.
European Patent Office Application No. 14151307.7, Office Action dated Aug. 10, 2017, 8 pages.
European Patent Office Application No. 17155928.9, Extended European Search Report dated Jul. 17, 2017,14 pages.
European Patent Office Application No. 16187932.5, Communication Pursuant to Article 94(3) EPC dated Sep. 6, 2017, 9 pages.
European Patent Office Application No. 17158253.9, Extended European Search Report dated Sep. 27, 2017, 8 pages.
Korean Patent Office Application No. 10-2016-7027748, Notice of Second Final Rejection dated Sep. 8, 2017, 9 pages.
U.S. Appl. No. 14/198,884, Non-Final Office Action dated Sep. 29, 2017, 11 pages.
Korean Patent Office Application No. 10-2017-7006891, Notice of Rejection dated Dec. 15, 2017, 8 pages.
Korean Patent Office Application No. 10-2017-7006891, Office Action dated Feb. 6, 2018, 7 pages.
U.S. Appl. No. 14/198,884 , "Final Office Action", dated Mar. 8, 2018, 17 pages.
EP 14151307.7, "Communication Pursuant to Article 94(3) EPC", dated Mar. 9, 2018, 9 pages.
EP 14151328.3, "Communication Pursuant to Article 94(3) EPC", dated Mar. 9, 2018, 8 pages.
JP 2017-097611, "Office Action", dated Mar. 27, 2018, 4 pages.
KR 10-2018-7006662, "Office Action", dated Apr. 24, 2018, 12 pages.
CN 201510019130.4, "Office Action", dated May 9, 2018, 6 pages.
JP 2017-171705, "Office Action", dated Jun. 26, 2018, 3 pages.
KR 10-2018-7013053, "Office Action", dated Jul. 20, 2018, 8 pages.
EP 17158253.9, "Office Action", dated Aug. 8, 2018, 7 pages.
EP 17159429.4, "Office Action", dated Aug. 28, 2018, 7 pages.
KR 10-2011-7003491, "Office Action", dated Aug. 13, 2018, 26 pages.
KR 10-2018-7006662, "Office Action", dated Sep. 18, 2018, 5 pages.
CN 201610915344.4, "Office Action," dated Apr. 26, 2019, 20 pages.
EP 18193311.0, "Extended European Search Report," dated Mar. 13, 2019, 12 pages.
EP 18200556.1, "Extended European Search Report," dated Apr. 17, 2019, 13 pages.
KR 10-2018-7013053, "Office Action," dated Mar. 13, 2019, 7 pages.
CN 201510019130.4, "Notice of Decision to Grant," dated Jul. 9, 2019, 7 pages.

* cited by examiner

SYSTEMS AND METHODS FOR SHIFTING HAPTIC FEEDBACK FUNCTION BETWEEN PASSIVE AND ACTIVE MODES

CROSS-REFERENCES TO RELATED APPLICATIONS

This patent application claims the benefit of and is a continuation of U.S. patent application Ser. No. 15/443,482, filed Feb. 27, 2017, and entitled "Systems and Methods For Shifting Haptic Feedback Function Between Passive and Active Modes," which claims the benefit of and is a continuation of U.S. patent application Ser. No. 14/712,358, filed on May 14, 2015, and entitled "Systems and Methods for Shifting Haptic Feedback Function Between Passive and Active Modes," which claims the benefit of and is a continuation of, U.S. patent application Ser. No. 13/832,420, filed on Mar. 15, 2013, and entitled "Systems and Methods for Shifting Haptic Feedback Function Between Passive and Active Modes," which claims the benefit of and is a continuation of U.S. patent application Ser. No. 12/502,758, filed on Jul. 14, 2009, and entitled "Systems and Methods for Shifting Haptic Feedback Function Between Passive and Active Modes," which claims the benefit of: U.S. Provisional Patent Application No. 61/080,978, entitled "Systems and Methods for Physics-Based Tactile Messaging" filed Jul. 15, 2008; U.S. Provisional Patent Application No. 61/080,981, entitled "Systems and Methods for Mapping Message Contents to Virtual Physical Properties for Vibrotactile Messaging" filed Jul. 15, 2008; U.S. Provisional Patent Application No. 61/080,985, entitled "Systems and Methods for Shifting Sensor Haptic Feedback Function Between Passive and Active Modes" filed Jul. 15, 2008; U.S. Provisional Patent Application No. 61/080,987, entitled "Systems and Methods for Gesture Indication of Message Recipients" filed Jul. 15, 2008; U.S. Provisional Patent Application No. 61/148,312, entitled "Systems and Methods for Pseudo-Telepresence in a Shared Space" filed Jan. 29, 2009; and U.S. Provisional Patent Application No. 61/181,280, entitled "Systems and Methods for Transmitting Haptic Messages" filed May 26, 2009, the entirety of each of which is hereby incorporated by reference herein.

FIELD OF THE INVENTION

The present invention generally relates to haptic feedback and more particularly to systems and methods for shifting haptic feedback function between passive and active modes.

BACKGROUND

Over the past several years, the use of handheld devices of all types has grown exponentially. These devices are used as portable organizers, telephones, music players, and gaming systems. Many modern handheld devices now incorporate some type of haptic feedback. As haptic technology improves, devices may incorporate multiple modes of haptic feedback. A way to switch between and select modes of feedback is needed.

SUMMARY

Embodiments of the present invention provide systems and methods for shifting between active and passive modes of haptic feedback. For example, in one embodiment, a method for shifting between active and passive modes of haptic feedback comprises receiving a first signal from a sensor, the first signal associated with a mode of interaction with a graphical user interface; receiving a second signal associated with an interaction with the graphical user interface; determining a haptic feedback effect based at least in part on the mode of interaction with the graphical user interface and the interaction with the graphical user interface; and generating a haptic signal configured to output the haptic feedback effect. In another embodiment, a computer-readable medium comprises program code for carrying out such a method.

These illustrative embodiments are mentioned not to limit or define the invention, but rather to provide examples to aid understanding thereof. Illustrative embodiments are discussed in the Detailed Description, which provides further description of the invention. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Figure 1:
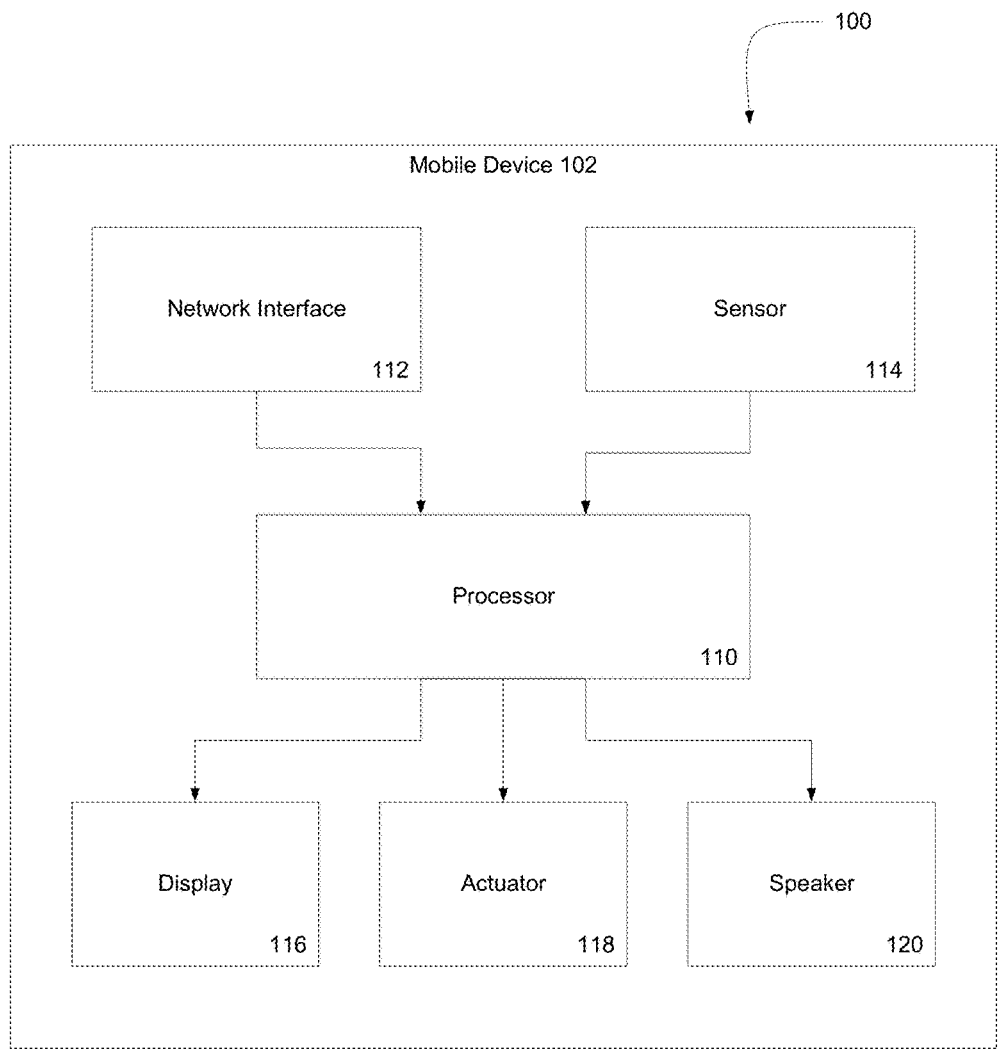
FIG. 1 is a block diagram of a system for shifting haptic feedback function between passive and active modes according to one embodiment of the present invention.

Embodiments of the present invention provide systems and methods for shifting haptic feedback function between passive and active modes.

Illustration of Shifting Haptic Feedback Function Between Passive and Active Modes One illustrative embodiment of the present invention comprises a messaging device, such as a mobile phone. In the illustrative embodiment, the messaging device comprises the Samsung SGH-i710 mobile computer equipped with Immersion Corporation's VibeTonz® vibrotactile feedback system. In another embodiment, the messaging device comprises Immersion Corporations TouchSense® Technology system also known as Immersion TouchSense® vibrotactile feedback system. Other messaging devices and haptic feedback systems may be utilized.

The messaging device comprises a display, a user interface device, memory, and a processor in communication with each of these elements. The illustrative messaging device also comprises a sensor and an actuator, both of which are in communication with the processor. The sensor is configured to sense a user interaction with the messaging device and the actuator is configured to output a haptic effect.

In the illustrative device, the processor receives a first signal associated with a mode of interaction with a messaging device's graphical user interface. The processor may receive the first signal from a sensor, such as a gyroscope or an accelerometer in the housing of the messaging device. Such a sensor may be configured to detect when a user moves or tilts the messaging device. A particular movement of the device may then be associated with a particular mode of interaction, such as a passive or active mode. For example, to engage an active mode of interaction, the messaging device may be tipped or rotated in a predetermined direction; to switch to a passive mode of interaction, the messaging device may be tipped or rotated in the opposite direction.

Next, the processor receives a second signal from the user interface device associated with an interaction with the graphical user interface. For instance, the processor may receive the second signal from a touch-sensitive input device, such as a touch-screen. The interaction may take a number of forms. For example, a user may brush, flick, rub, drag, or otherwise engage the touch-screen display to interact with a virtual object displayed on the graphical user interface. Alternatively, after a mode of interaction has been selected, a user may tilt, shake, rotate, or move the messaging device to interact with the graphical user interface. In an active mode of interaction, brushing or flicking a virtual object in the graphical user interface may cause the virtual object to move within the graphical user interface, while the processor generates a haptic signal simulating the virtual object's weight. In a passive mode of interaction, touching a virtual object, may cause the processor to generate a haptic signal simulating the virtual object's surface features, such as its texture. The simulation of the surface may take the form of a vibration or other haptic feedback effect.

After receiving both signals, the processor determines a haptic feedback effect based, at least in part, on the mode of interaction with the graphical user interface and the interaction with the graphical user interface. In an illustrative embodiment, a first signal is associated with an active mode of interaction and the second signal is associated with a user interaction with an object displayed on the graphical user interface. The user's interaction may involve moving a virtual object on the graphical user interface. The processor may then determine haptic feedback, which resembles a collision between the virtual object and another surface in the graphical user interface. Alternatively, if the first signal is associated with a passive mode of interaction and the second signal is associated with a rubbing motion on or near a virtual object, the processor may determine haptic feedback simulating the texture of the virtual object. Finally, the processor generates a haptic signal configured to cause an actuator to output the haptic effect. An actuator receives the haptic signal, and generates the haptic effect, for example by shaking, jolting, or vibrating the messaging device.

This illustrative example is given to introduce the reader to the general subject matter discussed herein. The invention is not limited to this example. The following sections describe various additional non-limiting embodiments and examples of methods and systems for shifting haptic feedback function between active and passive modes.

Shifting Haptic Feedback Function Between Passive and Active Modes

Embodiments of the invention presented herein provide systems and methods for shifting haptic feedback function between passive and active modes. A modern handheld device may include the capability to include multiple modes of feedback. These modes may be movement based "active modes" or texture based "passive modes." The modes of feedback may be output to the user visually through the display, audibly using speakers, or haptically using actuators. The claimed invention provides systems and methods for switching between active and passive modes of feedback.

For example, in a messaging device including an accelerometer and a touch-screen, a default mode of interaction may comprise an active mode of interaction. In such a mode, tilting the messaging device may cause virtual objects displayed on a graphical user interface to appear to roll around. In response to the movement of the virtual objects, the device may generate haptic feedback representing friction and impacts between the virtual objects and other surfaces. Using such a device, a user may also utilize the touch-screen to directly move a virtual object within the user interface. The user may tilt the messaging device to cause the virtual object to move on the graphical user interface. Or the user may directly manipulate the virtual object by touching the graphical user interface. The movement of the virtual object on the graphical user interface causes an actuator to generate one or more haptic effects based on the virtual object's friction profile.

Each virtual object comprises a virtual physical parameter which defines one or more of the object's size, mass, shape, collision behavior, and texture. The virtual physical parameter may also include the object's texture and friction profiles. The texture profile is a data store comprising parameters that define the object's reaction to user interaction in the passive mode of interaction. The texture profile may further define the virtual object's surface features. The friction profile is a data store comprising parameters defining the virtual object's reaction to user manipulations and its interaction with other virtual objects in the active mode of interaction. The friction profile may additionally define other properties, such as virtual height, weight, density, etc. When the user interacts with the virtual object or the virtual object interacts with other features on the graphical user interface, its movement and the haptic feedback in response to the interaction will be based, at least in part, on the virtual object's friction profile. For example, a ball could have a friction profile which causes the ball to respond to interaction by bouncing while another ball may respond by rolling. Furthermore, a dense heavy ball may move slowly with hard impacts on surfaces within the interface; while a lighter, less dense, ball may move quickly with softer impacts. A virtual object may be one of any number of shapes, including, but not limited to: a ball, an egg, a tube, a capsule or a box.

A virtual object may represent a type of data. For example, a virtual object may represent a video file within the device. Additionally, the shape chosen for a virtual objects shape may take into account the type of data represented by a virtual object. For example, a virtual object representing a picture may take the shape of a camera, while a virtual object representing a video file may take the for of a compact disk.

A virtual object may comprise a token A token is a type of virtual object that includes predefined parameters. The user may then define additional parameters of a specific instantiation of a token. For example, in one embodiment a token may comprise virtual object in the form of a ball, with predefined friction and texture profiles. The user may then define additional characteristics, such as the ball's size and color.

A processor may receive a shift or change signal associated with a different mode of interaction and switch to a passive mode of interaction. In the passive mode of interaction, haptic effects may be based on a texture profile of a virtual object rather than the friction profile. A texture profile is a data store that contains data representing surface features of a virtual object, such as texture and tension. When a user contacts a virtual object, the device may generate haptic effects that simulate the surface of the object. For example, a virtual object could have a rough surface indicated by rapid hard haptic pulses, while a virtual object with a soft surface could be indicated by a steady gentle vibration.

In some embodiments, the user interface may be represented as a virtual message environment programmed to incorporate a physical model. In such an environment, electronic messages may be displayed as a virtual message objects. A virtual message object is a form of virtual object that includes a data store incorporating an electronic message. A virtual message object comprises a virtual physical parameter which defines one or more of the object's size, mass, shape, collision behavior, and texture. The virtual physical parameter may also include the object's texture and friction profiles. The texture profile is a data store comprising parameters that define the object's reaction to user interaction in the passive mode of interaction. The texture profile may further define the virtual object's surface features. The friction profile is a data store comprising parameters defining the virtual object's reaction to user manipulations and its interaction with other virtual objects in the active mode of interaction. The friction profile may additionally define other properties, such as virtual height, weight, density, etc. A user can manipulate the virtual message environment and virtual message objects through various messaging device interfaces and sensors, such as a touch-screen, gyroscope, GPS, or accelerometer, or other sensor configured to detect movement.

A virtual message object may comprise a token A token is a type of virtual object that includes predefined parameters. The user may then define additional parameters of a specific instantiation of a token. For example, in one embodiment a token may comprise virtual object in the form of a ball, with predefined friction and texture profiles. The user may then define the text contained by the instantiation of the token as well as additional characteristics, such as the ball's size and color.

When a user is interacting with the device, a sensor detects the user's movements and transmit signals representing these movements to the processor. The processor may then calculate vectors which represent the displacement and magnitude of the users movement. The processor may then translate these vectors into virtual forces acting on virtual message objects contained within the virtual message environment. If the message is sent to a haptically enabled device, the haptic effect may be incorporated as a component of the message. For example, a user may incorporate a soft gesture into a message. When the recipient receives the message, this soft gesture may be translated into a soft haptic effect, indicating that a message is not urgent. Conversely, a user may incorporate a hard gesture into a message, which will be translated into hard haptic force indicating an urgent message. Like other virtual objects, virtual message objects may have both a texture profile and a friction profile, which may be used to calculate haptic effects.

In one embodiment, when a user wishes to switch between modes of feedback, a gesture, position, key, or other control is assigned as a selector for the mode of interaction. For example, a user can use a specific gesture to switch between active and passive modes of interaction, or to switch to another mode of interaction. The user interface may indicate/illustrate the change in mode through the visual display, a sound effect, and/or haptic feedback. For example, if the user switches from passive to active modes, the device may give a visual indication through the display while also providing a haptic indication, such as a vibration.

In another embodiment, the device may be equipped with a switch or button, which may be displayed on a touch screen to switch between modes of interaction. In this embodiment, for example, a user may depress a shift key, indicating an active mode of interaction. While operating in this mode, movements of the device can cause virtual objects in the display to move, roll, and collide with each other. When the user releases the shift key, the passive mode of interaction is enabled. In this mode, the virtual objects may exhibit different variables, such as a vibrating feedback representing each virtual object's texture. While in the passive mode, the virtual objects may continue movement on the screen and the user may interact with the virtual objects; however, the user cannot direct interaction between the virtual objects.

Illustrated System for Shifting Haptic Feedback Function Between Passive and Active Modes of Interaction Referring now to the drawings in which like numerals indicate like elements throughout the several figures, FIG. 1 is a block diagram of a system for shifting haptic feedback function between passive and active modes according to one embodiment of the present invention. As shown in FIG. 1, the system 100 comprises a messaging device 102, such as a mobile phone, portable digital assistant (PDA), portable media player, or portable gaming device. The messaging device 102 comprises a processor 110 in communication with a network interface 112, a sensor 114, a display 116, an actuator 118, and a speaker 120. The processor 110 is configured to generate a virtual environment, which is shown on display 116.

The processor 110 is in communication with the network interface 112. The network interface 112 may comprise one or more methods of mobile communication, such as infrared, radio, Wi-Fi, or cellular network communication. In other variations, the network interface 112 comprises a wired network interface, such as Ethernet. The messaging device 102 can be configured to exchange messages or virtual message objects with other devices (not shown) over networks such as a cellular phone network and/or the Internet. Embodiments of messages exchanged between devices may comprise voice messages, text messages, data messages, or other forms of digital messages.

The processor 110 is also in communication with one or more sensors 114. The sensor 114 may comprise a location sensor, rotational velocity sensor, image sensor, pressure sensor, or other type of sensor. For example, sensor 114 may comprise an accelerometer, a gyroscope, a GPS sensor, or a touch-sensitive input device (e.g. touch screen, touch-pad). The one or more sensors 114 may be configured to detect changes in, for example, acceleration, inclination, inertia, or location. For example, the messaging device 102 may comprise an accelerometer configured to measure the acceleration of the messaging device 102. As another example, the messaging device 102 may comprise a location sensor, rotary velocity sensor, image sensor, pressure sensor, or other type of sensor. The one or more sensors 114 may be configured to send a sensor signal to the processor 110.

Users may interact with the user interface through movements or gestures which are detected by the one or more sensors 114. As the messaging device 102 is tilted, shaken, or otherwise moved, the one or more sensors 114 may detect these movements and generate sensor signals sent to the processor 110 based, at least in part, on the movements. The processor may use these signals to generate vectors with a direction and magnitude that represents the direction and magnitude of the user's interaction with the device. In one embodiment, an accelerometer sensor is configured to detect the inclination and acceleration of the messaging device 102. As the messaging device 102 is tilted, an accelerometer can be configured to send signals to the processor 110 based, at least in part, on the tilt and/or acceleration of the messaging device 102. The processor 110 then uses these signals to generate vectors representing direction and magnitude of the interaction.

Signals received from the sensor 114 may be associated with a mode of interaction with a graphical user interface. For example, a jabbing motion detected by an accelerometer may be associated with an active mode of interaction, while a circular or rotational motion detected by an accelerometer may be associated with a passive mode of interaction. By mapping modes of interaction to particular gestures, the processor 110 may be able to switch modes of interaction quickly and effectively.

Signals received from the sensor 114 may also be associated with an interaction with the graphical user interface. For example, a user may first select a mode of interaction by pressing or depressing a shift key. After the mode of interaction has been selected, the messaging device may be tilted, rotated, shaken, or otherwise moved to interact with the graphical user interface. Each movement of the device detected by a sensor 114 may be associated with an interaction with the graphical user interface. In one mode of interaction, tilting the device may zoom in or zoom out of the graphical user interface. For example, a digital image may be shown on the display 116. To manipulate the image, the user may select an active mode of interaction, and then tilt the device such that sensor 114 detects the movement. The device may then manipulate the image shown on display 116 based on the data received from sensor 114. The device could manipulate the image in many different ways; for instance, the manipulation could involve zooming in or away from the image, scrolling, or rotating the displayed image.

The processor 110 may receive signals associated with a mode of interaction and/or signals associated with an interaction from other sources (not shown in FIG. 1). For example, the messaging device 102 may comprise a scroll wheel, a rocker switch, or a joystick (not shown in FIG. 1). The messaging device 102 may also comprise one or more buttons, such as a shift button (not shown in FIG. 1).

In the embodiment shown in FIG. 1, the processor 110 is also in communication with a display 116. The processor 110 can be configured to generate a graphical representation of a user interface to be shown on display 116. The display 116 may comprise a touch-sensitive input device, such as a touch screen, configured to send and receive signals from the processor 110.

Signals received from a touch-screen display 116 may be associated with a mode of interaction with the graphical user interface. In one variation, a predetermined gesture, such as a tap on a touch-screen, may be associated with a specific mode of interaction. In one such embodiment, one tap on the touch-screen may be associated with an active mode of interaction, while two taps on the touch-screen may be associated with a passive mode of interaction. In another variation, a gesture detected by a touch-screen in a particular area of the display 116, such as an upper right quadrant, may be associated with one mode of interaction, while a gesture detected by a touch-screen in a different area of the display 116, such as a lower left quadrant, may be associated with a second mode of interaction. Various other combinations of gestures or user actions may be utilized to switch between modes of interaction.

In the embodiment shown in FIG. 1, the device can allow the user to directly manipulate objects shown on display 116. If display 116 comprises a touch-screen display, in an active mode of interaction two-dimensional finger gestures on display 116 may select, drag, flick, throw, or move a virtual object within the user interface. In a passive mode of interaction, two-dimensional finger gestures on display 116 may touch and/or feel a virtual object without changing its location within the graphical user interface.

The processor 110 may determine a haptic feedback effect based, at least in part, on the mode of interaction with the graphical user interface and the user's interaction with the graphical user interface. In the active mode of interaction, the processor 110 may determine a haptic effect simulating a jolt or a collision based on a user interaction, such as a jab or a flick. For example, the display may show a ball, which the user flicks. When the user flicks the image of the ball, processor 110 may determine a haptic effect representing a jolt to the user. The jolt exhibiting characteristics of the virtual ball contained in its friction profile, such as the ball's weight, density, and type of interaction with other virtual objects. Processor 110 may further calculate a collision when the virtual ball impacts a side of display 116. In a passive mode of interaction, processor 110 may determine a haptic effect simulating a rough or smooth texture based on an interaction such as a brush or rub. For example, in one embodiment, display 116 shows a ball with a texture profile comprising data representing a rough surface. When the user then interacts with the ball, processor 110 may calculate a haptic signal representing a series of haptic jolts, indicating the ball's rough surface.

As shown in FIG. 1, processor 110 is also in communication with one or more actuators 118. Actuator 118 may be configured to receive a signal from processor 110 and generate a haptic effect. After processor 110 determines a haptic effect, processor 110 may send a haptic signal to the actuator 118 configured to cause actuator 118 to output the haptic effect. Actuator 118 may be, for example, a piezoelectric actuator, an electric motor, an electro-magnetic actuator, a voice coil, a linear resonant actuator, a shape memory alloy, an electro-active polymer, a solenoid, an eccentric rotating mass motor (ERM), or a linear resonant actuator (LRA).

Figure 2:
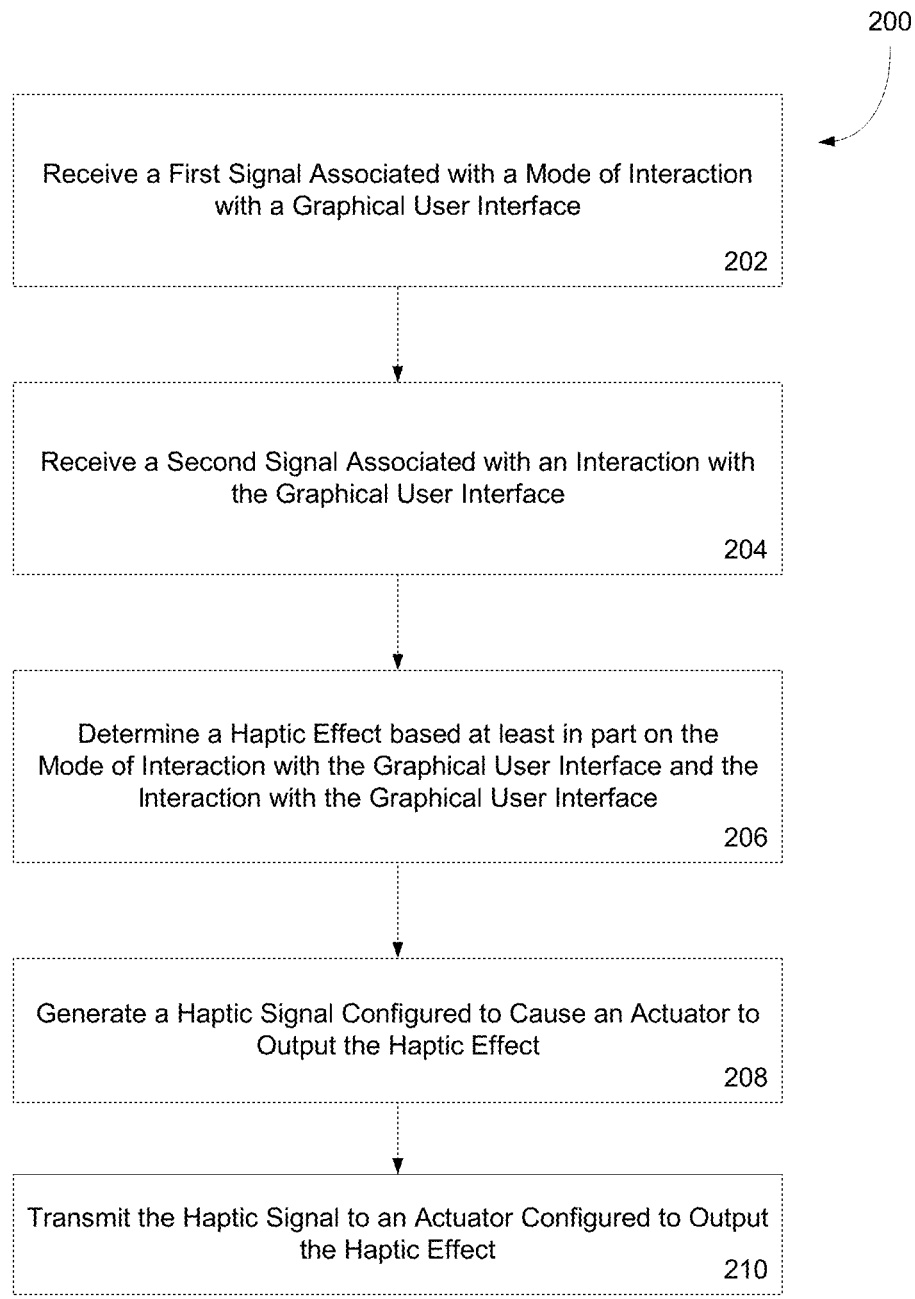
FIG. 2 is a flow diagram of a method for mapping message contents to virtual physical properties for vibrotactile messaging according to one embodiment of the present invention.

Illustrative Method for Shifting Haptic Feedback Function Between Passive and Active Modes of Interaction FIG. 2 is a flow diagram of a method for determining a haptic effect based, at least in part, on a mode of interaction and a user's interaction with a graphical user interface. While embodiments of the current invention may be utilized in a variety of devices, the process shown in FIG. 2 will be described in relation to the device shown in FIG. 1. In method 200, a processor 110 receives a first signal associated with a mode of interaction with a graphical user interface 202. In one embodiment, the signal indicates a change in the mode of interaction; in other embodiments it represents no change in the mode of interaction. A signal associated with a mode of interaction may be generated by a sensor 114, such as an accelerometer, a gyroscope, a GPS sensor, a microphone, a touch-sensitive input device (e.g. touch screen, touch-pad), a texture stylus, an imaging sensor, or some other type of sensor. Or the mode of interaction may be selected through a button or switch. For example, a mode of interaction may be selected by rotating the messaging device 102 in a predetermined manner, depressing a shift button, blowing into a microphone, or making a gesture on a touch-screen display 116. In one embodiment, the first signal is controlled in part by the processor. For example, the processor may receive an input, and use this input to calculate and then transmit a signal which will change the mode of interaction with the graphical user interface. In another embodiment, the first signal is controlled to return to a default setting after a period of time. For example, the device may have a default setting of the passive mode of interaction and, if the mode of interaction has been set to active for more than 5 minutes, the processor may switch the device back to passive mode.

The graphical user interface can display virtual objects with which a user may interact. In the embodiment shown, the graphical user interface comprises one or more modes of interaction. In one example, the graphical user interface comprises an active mode of interaction and a passive mode of interaction. In an active mode of interaction, for example, a user may direct interactions between one or more virtual objects and other virtual objects and/or the virtual environment. In a passive mode of interaction, a user may interact only with a virtual object without interacting with a virtual environment or causing the virtual object to interact with other objects in the virtual environment.

After a mode of interaction is selected, the processor receives a second signal associated with an interaction with the graphical user interface 204. The signal associated with an interaction may be generated by a touch-sensitive input device (e.g. touch screen, touch-pad) or some other type of sensor, such as an accelerometer, a gyroscope, a GPS sensor, a microphone, a texture stylus, or an imaging sensor. In one example, a user interacts with the user interface by contacting a virtual object through a touch-screen display 116. The processor 114 receives a signal from the touch-screen display 116 associated with the gesture or contact made by the user. The signal associated with the interaction may include properties of the interaction, such as location, speed, pressure, and/or type. For example, a signal from a touch-screen display 116 may include the location of the contact with the touch-screen display 116, the speed and/or pressure of the contact, the duration of the contact, and the type of gesture or motion made on the touch-screen display 116.

The first signal and the second signal may be received substantially simultaneously. For example, a user may depress a shift key and make a gesture on a touch screen substantially simultaneously. In such a scenario, the processor receives the first signal associated with a mode of interaction at substantially the same time as processor 110 receives a second signal associated with a user interaction with the user interface. In another variation, processor 110 receives the second signal at some later period of time, such as a half second to several seconds or more, after receiving the first signal. For example, a user may select a mode of interaction by moving the messaging device in a predetermined manner. Later, a user may interact with the user interface by making a gesture on the touch-screen display 116 of the messaging device. The device may have a user-selected default mode of interaction.

The processor 110 determines a haptic effect based, at least in part, on the mode of interaction with the graphical user interface and the interaction with the graphical user interface 206. In a passive mode of interaction, haptic effects may be based on the texture profile of the graphical user interface and/or a virtual object displayed in the graphical user interface. In a passive mode of interaction, when a user rubs or brushes a virtual object, the processor may determine a haptic effect simulating a texture of the virtual object, such as a vibration simulating a rough or smooth texture. In an active mode of interaction, haptic effects may be based on the friction profile of the graphical user interface and/or a virtual object displayed on the graphical user interface. In an active mode of interaction, when a user rubs or brushes a virtual object, the virtual object may move on the display in correlation to the user's movement. Then, as the virtual object moves in the display, the processor may determine a haptic effect simulating the movement of the virtual object. For example, the processor may generate a long, low rumble for a heavy object, or a gentler vibration to simulate a lighter object.

Next, the processor 110 generates a haptic signal configured to cause an actuator 118 to output the haptic effect 208. Finally, the processor 110 transmits the haptic signal to one or more actuators 118 configured to output the haptic effect 210. After receiving the haptic signal, the actuator 118 then outputs the haptic effect. The haptic effect may comprise many different types of feedback, including but not limited to: feedback representing texture, feedback representing tension, feedback representing grip, feedback representing a flick, feedback representing a stroke, feedback representing popping, feedback representing cracking, feedback representing movement, feedback representing friction, or feedback representing a collision or collisions.

In one illustrative embodiment, the graphical user interface displays a virtual object in the shape of a heart. Then, processor 110 receives a signal associated with a passive mode of interaction. Next, processor 110 receives a signal associated with a rub or a brush of the virtual heart. Then, based on both of the received signals and on the virtual heart's texture profile, processor 110 may determine a haptic effect simulating a beating heart, which is output when the user interacts with the virtual heart. Actuator 118 receives the haptic signal and generates the haptic effect simulating a beating heart.

In another illustrative embodiment, the graphical user interface displays a virtual object in the shape of a heart. The processor 110 first receives a signal associated with an active mode of interaction, and then receives a signal associated with a user's interaction with the virtual heart. At this point, processor 110 may determine a haptic effect based on both the received signals and the virtual heart's friction profile. The calculated effect may simulate the heart's weight as the user drags it across the screen. An actuator 118 receives a haptic signal and generates the haptic effect simulating the heart's weight.

Figure 7:
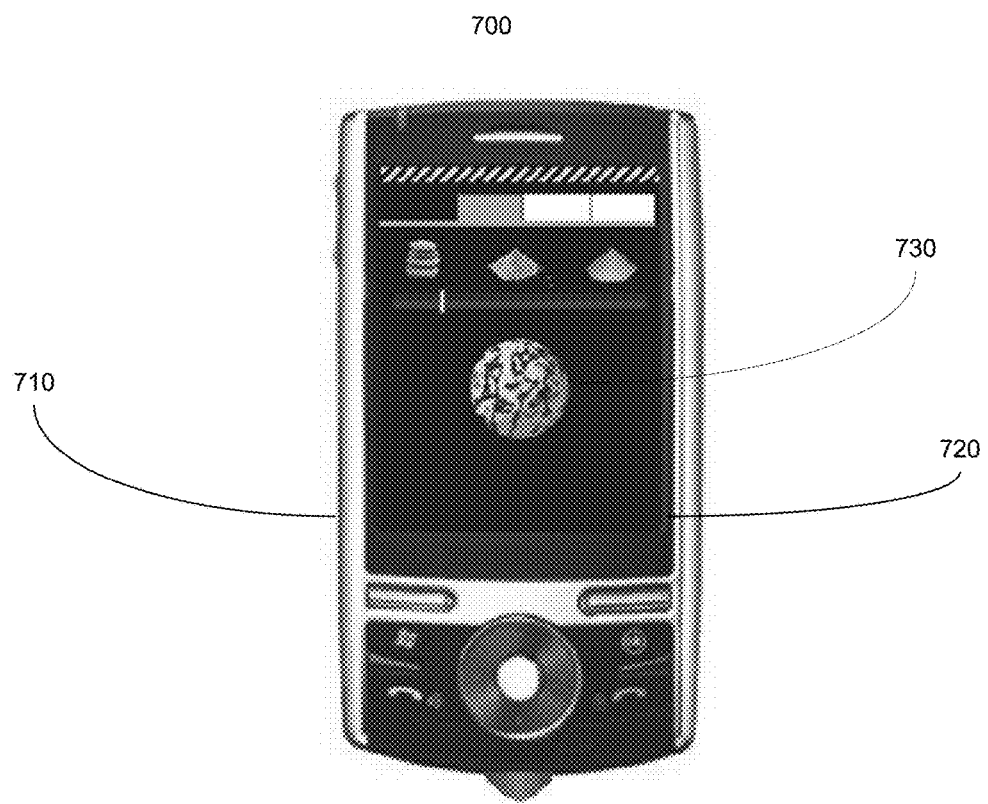
FIG. 7 is an illustration of a virtual object that may be displayed according to one embodiment of the present invention.

In another illustrative embodiment, the graphical user interface displays a virtual messaging environment. In the virtual messaging environment, an electronic message such as an email, text message, instant message, or other type of message is displayed as a virtual message object. In one embodiment, the virtual message object comprises one of: a ball, a tube, a capsule, a box, a balloon, a heart, or any other shape the graphical user interface is capable of displaying. FIG. 7 shows a messaging device 710, that includes a display 720 showing a virtual message object in the form of a ball with a rough surface 730. The virtual message object further comprises a virtual physical parameter which defines one or more characteristics of the virtual object, such as: size, mass, shape, collision, or texture. A virtual physical parameter may be modified by either the user or the program itself. In this illustrative embodiment, the processor 110 receives a signal associated with an interaction with the virtual message object in the virtual messaging environment. Then the processor 110 receives a signal associated with an interaction with the virtual message object in the virtual messaging environment. Processor 110 may then determine a haptic effect based, at least in part, on the mode of interaction with the virtual message object and the interaction with the virtual messaging object.

For example, in one embodiment, the graphical user interface displays a virtual messaging environment and a virtual message object in the form of a balloon. The balloon comprises a virtual physical parameter which defines its size, shape, and collision behavior. The processor may then receive signal associated with an active mode of interaction, and may further receive a signal associated with a user poking the balloon. The processor will then calculate a haptic effect based, at least in part, on the mode of interaction and the interaction in this case, active mode of interaction and a poking interaction. The processor will then transmit the calculated haptic signal to an actuator configured to output the haptic effect. The haptic effect may be, for example, a signal representing the virtual balloon popping. The processor may further perform an action with the virtual message object, such as sending the virtual message when the virtual balloon pops.

Figure 3:
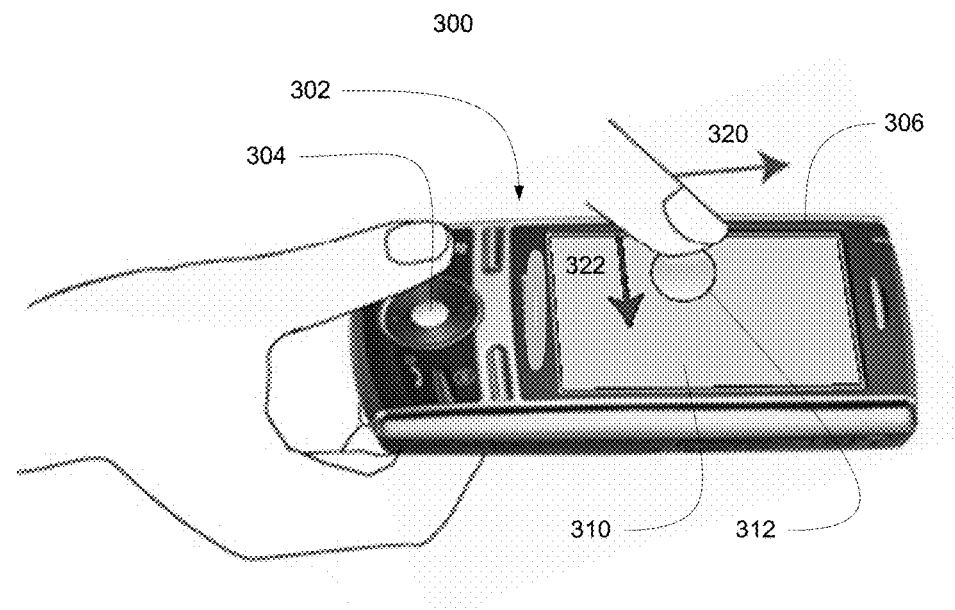
FIG. 3 is another illustration of shifting haptic feedback function between passive and active modes according to one embodiment of the present invention.

Illustrations of Shifting Haptic Feedback Function Between Passive and Active Modes of Interaction FIG. 3 is an illustration of shifting haptic feedback function between passive and active modes of interaction according to one embodiment of the present invention. In FIG. 3, a messaging device 302 comprises a shift button 304 and a touch-screen 306. The messaging device 302 generates a graphical user interface, such as a virtual environment 310 shown on the touch-screen 306.

As shown in FIG. 3, the graphical user interface 310 comprises one virtual object 312 in the form of a ball. In other embodiments, the graphical user interface may contain zero, one, or more virtual objects. When no objects are displayed, the background of the display may have its own friction and texture profiles. When virtual objects are displayed, each virtual object comprises a virtual physical parameter. The virtual physical parameter may include one or more characteristics of the virtual object, such as: size, shape, mass, collision behavior, or texture. The physical parameter may further include a friction and/or a texture profile which define the virtual object's interaction with the user and with other virtual objects. For example, the friction profile of a virtual ball may comprise a rolling or bouncing profile. And the texture feedback profile of a virtual ball may comprise a semi-rough or tacky surface. The processor may determine a haptic effect based, at least in part, on a friction profile and/or a texture profile of a virtual object.

Each virtual object may comprise one or more virtual physical parameters. A virtual physical parameter can comprise a size, a mass, a shape, a collision behavior, a texture, or a visual representation. In some scenarios, a virtual object represents a message, such as a text message, a file message, or a voicemail. The virtual physical parameters of a virtual object may be based, at least in part, on the type of data the virtual object represents. In one example, a virtual object may represent a short text message and may comprise a light, thin, cylindrical object that is neither bouncy nor brittle. A virtual object representing a long video file may comprise a large, heavy oval object that cracks.

The friction profile and/or the texture profile may be based, at least in part, on the virtual physical parameters of a virtual object. For example, the friction profile of an egg-like virtual message object may dictate a cracking or breaking action when the virtual egg moves in the virtual environment. Thus, when a virtual egg object moves within a virtual environment and cracks or breaks, a haptic feedback effect simulating the virtual egg cracking or breaking may be generated in one mode of interaction. In another mode of interaction, the egg may feel smooth to the touch, represented as vibrations with a textural character.

A virtual object may comprise a token A token is a type of virtual object that includes predefined parameters. The user may then define additional parameters of a specific instantiation of a token. For example, in one embodiment a token may comprise ball with predefined friction and texture profiles. The user may then define additional characteristics of the ball, such as its size and color.

Before interacting with the user interface 310, a mode of interaction may be selected. For example, the shift button 304 may be used to select a mode of interaction with the user interface. As shown in FIG. 3, the shift button 304 is not depressed. When the shift button 304 is not depressed, the user interface 310 may remain in a mode of interaction that the user has defined as the default. When the shift button is activated, or pressed, the user interface may switch to a different mode of interaction. While the shift button 304 is depressed, it may generate a signal indicating a change in mode of interaction. A processor (not shown in FIG. 3) of the messaging device 302 may receive the low signal from the shift button 304 and determine that the passive mode of interaction is intended. When a high signal is received from the shift button 304, the processor may determine that an active mode of interaction is intended. In other variations, the default mode of interaction may comprise an active mode of interaction or some other mode of interaction. In other embodiments, the processor may control the mode of interaction, and return the mode of interaction to a user-defined default after a user-defined period of time.

After the mode of interaction is selected, a user may interact with the user interface 310 and/or the virtual object 312 by contacting the touch-screen 306. In other variations, a user may interact with the user interface 310 and/or the virtual object 312 by shaking, tilting, rotating, or otherwise moving the messaging device. For example, in one embodiment, the display may show a virtual ball. In the active mode of interaction, the user may tilt the screen causing the virtual ball to roll inside the graphical user interface. The device may output a haptic effect when the virtual ball rolls to a boundary of the graphical user interface. In another embodiment, the virtual ball may represent a text message, email, or other electronic message. When the virtual ball representing a message rolls to a boundary of the graphical user interface, the device may allow the virtual ball to roll off the display, thereby sending the message.

As shown in FIG. 3, the user interface 310 is in a first mode of interaction and a user is brushing or rubbing the touch-screen 306 in the directions illustrated by arrow 320 and arrow 322. In a first mode of interaction, such as a passive mode, brushing or stroking the virtual object 312 may cause the messaging device 302 to simulate or portray the texture profile of the virtual object 312 through haptic feedback. After the processor receives a signal associated with an interaction with the virtual object 312, the processor determines a haptic effect simulating a texture profile of the virtual object 312, such a vibration simulating the surface, composition, and/or material of the virtual object 312. The processor then sends a haptic signal to an actuator (not shown in FIG. 3) which generates the haptic effect.

Figure 4:
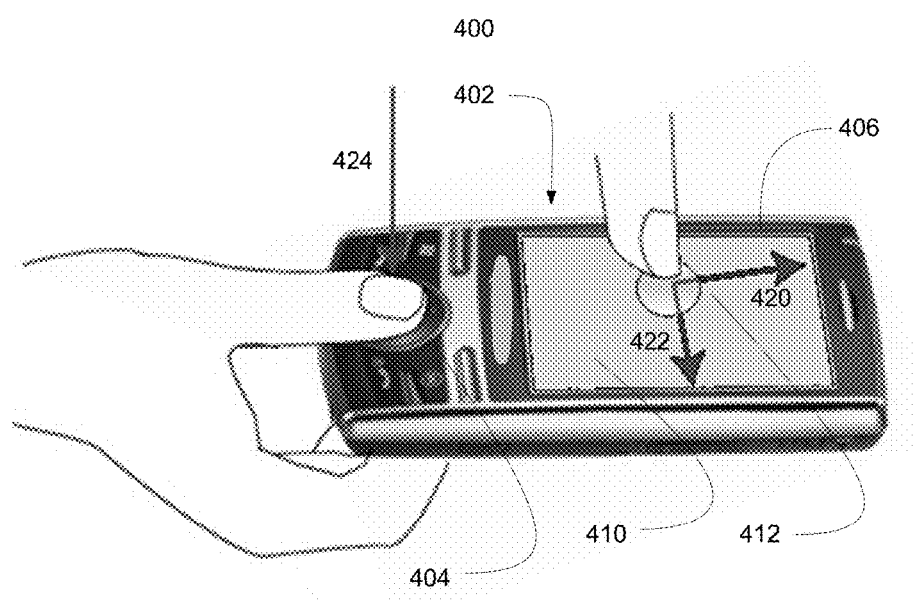
FIG. 4 is another illustration of shifting haptic feedback function between passive and active modes according to one embodiment of the present invention.

FIG. 4 is an illustration of shifting haptic feedback function between passive and active modes according to one embodiment of the present invention. In FIG. 4, a messaging device 402 comprises a shift button 404 and a touch-screen 406. The messaging device 402 displays a graphical user interface, such as a virtual environment 410 shown on the touch-screen 406. A virtual object 412, illustrated as a ball, is shown inside the virtual environment 410.

As shown in FIG. 4, a user is depressing the shift key 404 in a downward motion indicated by arrow 424. At substantially the same time, or substantially simultaneously, a user is manipulating the virtual object displayed in the user interface by contacting the touch-screen in the direction shown by arrow 420 and arrow 422. By depressing the shift button, the user may set the device to an active mode of interaction with the graphical object. In the active mode of interaction, the graphical object may become "grippable." In this mode, the device may respond to finger gestures on the touch-screen with haptic feedback representing friction between the object and background surface.

In a passive mode of interaction, signals received from an accelerometer may not affect a gripped virtual object. However, in an active mode of interaction, accelerometer signals may still affect other virtual objects in the user interface 410 (not shown in FIG. 4). Finger gestures may now activate a friction profile of the virtual object 412. For example, when the user depresses the shift button and makes a flicking gesture on the touch-screen, the processor may respond by moving the graphical object within the user interface and generating a haptic effect representing friction between the virtual environment and the virtual object. This calculation is based in part on the friction profile of the virtual object and the virtual environment.

Although the messaging device illustrated in FIGS. 3 and 4 utilizes a shift button to send signals to the processor associated with the selection of a mode of interaction, other methods and/or devices may be used to accomplish this. As one example, tilting the messaging device in a forward direction may be associated with an active mode of interaction, whereas tilting the messaging device in a rear direction may be associated with passive mode of interaction. As another example, double-clicking on the touch-screen may select the active mode of interaction, while single-clicking on the touch-screen may select the passive mode of interaction.

Figure 5:
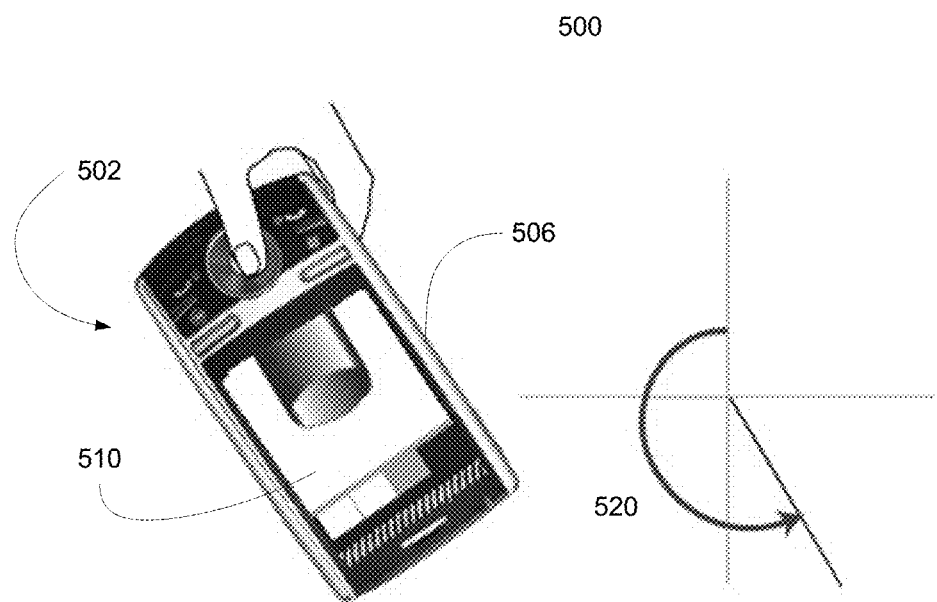
FIG. 5 is yet another illustration of shifting haptic feedback function between passive and active modes according to one embodiment of the present invention.

FIG. 5 is an illustration of shifting haptic feedback function between passive and active modes according to one embodiment of the present invention. In FIG. 5, a messaging device 502 comprises an accelerometer (not shown in FIG. 5) and a touch-screen 506. The messaging device 502 generates a graphical user interface, such as a virtual environment 510 shown on the touch screen 506.

As shown in FIG. 5, a user is rotating or moving the messaging device 502 in a circular motion indicated by the arrow 520. After the sensor detects the circular motion, it sends a signal to the processor (not shown in FIG. 5). The processor receives the sensor's signal and determines that the circular motion is associated with a change in the mode of interaction.

After moving the device in the predetermined manner, the user interface may shift from an active to a passive mode of interaction, or from a passive to an active mode of interaction. After the user interface shifts its mode of interaction, the user may interact with the user interface according to the new mode of interaction.

Figure 6:
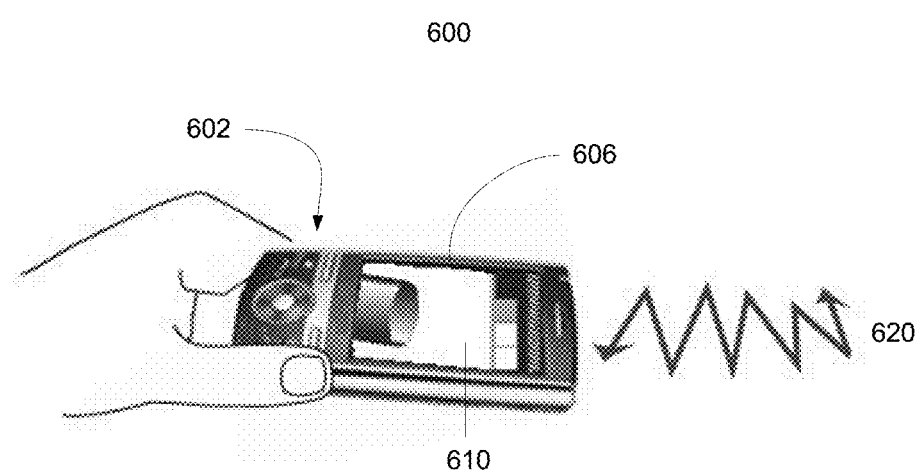
FIG. 6 is a final illustration of shifting haptic feedback function between passive and active modes according to one embodiment of the present invention.

FIG. 6 is an illustration of shifting haptic feedback function between passive and active modes according to one embodiment of the present invention. In FIG. 6, a messaging device 602 comprises an accelerometer (not shown in FIG. 6) and a touch-screen 606. The messaging device 602 generates a graphical user interface, such as a virtual environment 610 shown on the touch screen 606.

As shown in FIG. 6, a user is jostling or shaking the messaging device 602 in a circular motion indicated by the arrow 620. After the sensor detects the jostling motion, the sensor sends a signal to the processor (not shown in FIG. 6). The processor receives the sensor signal and determines that the jostling motion is associated with a change in the mode of interaction.

After moving the device in the predetermined manner, the user interface may shift from a passive to an active mode of interaction, or from an active to a passive mode of interaction. After the mode of interaction is switched, the user may interact with the graphical user interface according to the new mode of interaction. For example, in one embodiment, the user may select a passive mode of interaction while typing an email. Then, wishing to send the email, the user may rotate or otherwise move the device in a predetermined manner, causing the device to switch to an active mode of interaction, in which the email may be shown on the display as a virtual ball. The user may then flick the ball to send the email; this action may trigger the processor to calculate a haptic signal which generates a jolt, symbolizing the weight of the virtual ball. Then, as the virtual ball travels off the display, the device sends the email. The user may then rotate the device or move the device in another predetermined manner to switch the device back to passive mode of interaction.

Embodiments of the present invention can be implemented in digital electronic circuitry or in computer hardware, firmware, software, or in combinations of these. In one embodiment, a computer may comprise a processor or processors. The processor comprises a computer-readable medium, such as a random access memory (RAM) coupled to the processor. The processor executes computer-executable program instructions stored in memory, such as executing one or more computer programs for messaging. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with media, such as computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage or transmission device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. Both the processor and the processing described may be in and/or dispersed through one or more structures. The processor may comprise code for carrying out one or more of the methods (or parts of methods) described herein.

General

The foregoing description of the embodiments, including preferred embodiments, of the invention has been presented only for the purpose of illustration and description and is not intended to be exhaustive nor to limit the invention to the precise forms disclosed. Numerous modifications and adaptations thereof will be apparent to those skilled in the art without departing from the spirit and scope of the invention.

That which is claimed is:

1. A system comprising:
   a display device configured to display a virtual object within a graphical environment;
   a haptic output device; and
   a processor configured to:
      detect user interaction with the virtual object;
      determine whether the user interaction is detected while the system is in an active mode of interaction or a passive mode of interaction, wherein the active mode of interaction is a mode in which the system moves the virtual object within the graphical environment based on the user interaction, and wherein the passive mode of interaction is a mode in which the user interaction causes the system to simulate a surface feature of the virtual object;
      in response to a determination that the user interaction is received while the system is in the active mode of interaction, determine a haptic effect based on at least one of a simulated friction experienced by the virtual object while it is moving in the graphical environment or a simulated impact experienced by the virtual object;
      in response to a determination that the user interaction is received while the system is in the passive mode of interaction, determine the haptic effect based on the simulated surface feature of the virtual object; and
      control the haptic output device to output the haptic effect.

2. The system of claim 1, wherein the surface feature is a simulated texture of the virtual object.

3. The system of claim 1, wherein the system is a mobile device, the display device comprises a touchscreen, and the user interaction is a touch input applied by a user on the touchscreen.

4. The system of claim 3, wherein when the mode of interaction comprises an active mode of interaction the haptic effect is configured to simulate collision between the user and the virtual object.

5. The system of claim 3, wherein when the mode of interaction comprises a passive mode of interaction the haptic effect is configured to simulate a texture of the virtual object at a location of the touchscreen touched by the user.

6. The system of claim 3, wherein the virtual object comprises data and a shape of the virtual object is determined based on a type of the data.

7. The system of claim 3, further comprising a sensor configured to detect movement of the mobile device and wherein the processor is configured to determine a change in the mode of interaction based in part on the movement.

8. The system of claim 7, wherein the processor is configured to determine a haptic effect based in part on the change in mode of operation.

9. The system of claim 1, wherein the graphical environment comprises a plurality of virtual objects, and wherein each of the plurality of virtual objects is associated with a type of data.

10. A method comprising:
    displaying a virtual object within a graphical environment;
    detecting user interaction with the virtual object;
    determining whether the user interaction is detected while a system is in an active mode of interaction or a passive mode of interaction, wherein the active mode of interaction is a mode in which the system moves the virtual object within the graphical environment based on the user interaction, and wherein the passive mode of interaction is a mode in which the user interaction causes the system to simulate a surface feature of the virtual object;
    in response to a determination that the user interaction is received while the system is in the active mode of interaction, determine a haptic effect based on at least one of a simulated friction experienced by the virtual object while it is moving in the graphical environment or a simulated impact experienced by the virtual object;
    in response to a determination that the user interaction is received while the system is in the passive mode of interaction, determine the haptic effect based on the simulated surface feature of the virtual object; and
    controlling a haptic output device to output the haptic effect.

11. The method of claim 10, wherein the surface feature is a simulated texture of the virtual object.

12. The method of claim 10, wherein the displaying is on a display of a mobile device, the display comprising a touchscreen, and the user interaction is a touch input applied by a user on the touchscreen.

13. The method of claim 12, wherein when the mode of interaction comprises an active mode of interaction the haptic effect is configured to simulate collision between the user and the virtual object.

14. The method of claim 12, wherein when the mode of interaction comprises a passive mode of interaction the haptic effect is configured to simulate a texture of the virtual object at a location of the touchscreen touched by the user.

15. The method of claim 12, wherein the virtual object comprises data and a shape of the virtual object is determined based on a type of the data.

16. The method of claim 12, further comprising detecting a movement of the mobile device and determining a change in the mode of interaction based in part on the movement.

17. The method of claim 16, further comprising determining a haptic effect based in part on the change in mode of operation.

18. The method of claim 10, wherein the graphical environment comprises a plurality of virtual objects, and wherein each of the plurality of virtual objects is associated with a type of data.

19. A non-transitory computer readable medium comprising program code, which when executed by a processor is configured to cause the processor to:
- display a virtual object within a graphical environment;
- detect user interaction with the virtual object;
- determine whether the user interaction is detected while a system is in an active mode of interaction or a passive mode of interaction, wherein the active mode of interaction is a mode in which the system moves the virtual object within the graphical environment based on the user interaction, and wherein the passive mode of interaction is a mode in which the user interaction causes the system to simulate a surface feature of the virtual object;
- in response to a determination that the user interaction is received while the system is in the active mode of interaction, determine a haptic effect based on at least one of a simulated friction experienced by the virtual object while it is moving in the graphical environment or a simulated impact experienced by the virtual object;
- in response to a determination that the user interaction is received while the system is in the passive mode of interaction, determine the haptic effect based on the simulated surface feature of the virtual object; and
- control a haptic output device to output the haptic effect.

* * * * *